July 3, 1951 C. GAUTHIER 2,559,354

SOUND REPRODUCING SYSTEM AND APPARATUS

Filed June 2, 1950

Crosby Gauthier
INVENTOR

Patented July 3, 1951

2,559,354

UNITED STATES PATENT OFFICE 2,559,354

SOUND REPRODUCING SYSTEM AND APPARATUS

Crosby Gauthier, Chicago, Ill.

Application June 2, 1950, Serial No. 165,710

8 Claims. (Cl. 179—100.11)

Figure 1:
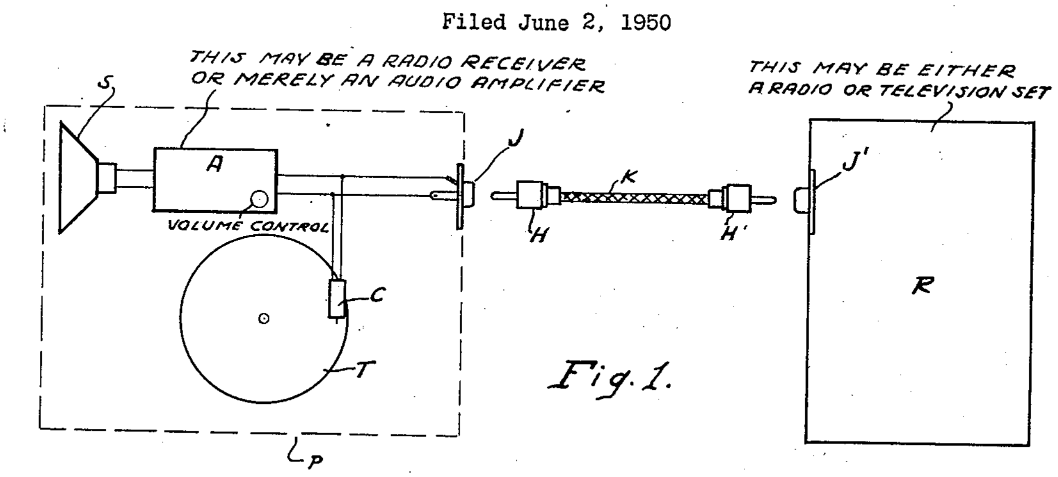

This invention has to do with the reproduction of phonograph recordings and the like and relates more particularly to an improved apparatus, and system by virtue of which it is made possible to achieve oustandingly fine reproduction quality through the medium of a cheap record player which in itself is capable of no more than mediocre or distinctly inferior performance.

While the description hereinafter refers specifically to apparatus for playing disc records, it will become apparent that the invention is equally applicable to the playing of recordings on wire or tape.

Experience has shown that low-priced record players such as are now on the market cannot, as a practical matter, be equipped with loud speakers and amplifiers capable of affording good tonal quality. This is for the reason that the added cost of even moderately high grade components would put the price of the player at such a level that it could not be sold except to a very limited extent, which would be wholly unprofitable to most manufacturers. Price is an inexorably controlling factor in the merchandising of equipment of that character, to such a degree that the cheapest and junkiest player will far outsell a definitely superior product priced only a trifle higher.

My primary object is to provide a record player which can successfully compete in the viciously competitive low-priced market but which nevertheless is capable of affording reproduction of excellent quality.

At the present time there are several types of record playing equipment in use or on the market. First, there are radio-phonograph sets with record playing equipment adapted to play only records of the 78 R. P. M. variety and not the more recently developed microgroove records which operate at 33⅓ R. P. M. and 45 R. P. M. Secondly, there are three-speed radio-phonographs capable of playing all types of records. These are expensive. Thirdly, there are plug-in units not including amplifiers and speakers, which are designed for use in conjunction with radio receivers. Some of these operate at 33⅓ R. P. M. only, and others at 45 R. P. M. only, while still others are three-speed machines. Fourthly, there are self-contained record players, including amplifiers and speakers, both single speed and multiple speed. A few of these comprise good speakers and amplifiers but are too high priced, except for what may be called the carriage trade, while the remainder comprise cheap amplifiers and speakers and sell at a relatively low price.

As matters stand, persons unwilling or unable to pay a high price for record playing equipment must choose between a unit which plugs into a radio receiver and does not include a speaker and amplifier, and, alternatively, a unit which includes a poor speaker and amplifier and is not adapted to plug into a radio receiver. If he chooses the latter he simply cannot get good reproduction; and if he chooses the former he can make no use of the unit apart from a radio receiver.

It appears that no one heretofore has conceived or advanced the idea underlying the present invention of adapting a record player of the type including an amplifier and speaker so that it can be operatively combined with a radio receiver, thus making it possible to utilize the amplifier and speaker of a fine radio or television set in combination with the turntable and pickup of a cheap record player; or if anyone has in fact ever before conceived that idea he must have given it up as impracticable on the theory that it would not work out successfully. I have not only conceived and reduced to practice the idea of equipping a cheap record player, including amplifier and speaker, with a jack and cord, or equivalent means, for effecting connection with the audio amplifier of a radio receiver or television set, but I have made the further discovery that through such a combination the speakers of both the player and the radio receiver or television set can be utilized at one and the same time and that the output of the two can be independently regulated as to both tone and volume with results that are truly magnificent. In other words, through such a combination I have found it possible in many instances to achieve a distinctly better or more satisfying quality of reproduction than could be realized through the use of the speaker and amplifier of a good radio receiver alone. I have discovered that although the amplifier and speaker combination of a cheap record player is inherently incapable of affording satisfactory reproduction of classical recordings, its deficiency lies mainly in what is absent rather than in excessive distortion of what is present, for which reason it is possible to combine the very limited output of the cheap player with the superior output of a good radio or television set speaker in such a way as to achieve a definite aggregate improvement. That is to say, the deficient output of the cheap player will actually contribute materially to the over-all result. This is especially manifest when the tone control of the radio or television receiver is set to emphasize the bass while the cheap record player is set to emphasize the treble. Ordinary good quality radio receivers with large speakers have a fairly broad frequency range, but if the tone control is set to fully emphasize the bass a major part of the audible upper register is lost; and it is only through the use of two speakers that the entire desirable frequency range can be brought out with any approach to linearity. I have found that where an ordinary good radio receiver having only one speaker is combined with a cheap record player and the tone control of the radio receiver is adjusted to emphasize the bass I can obtain much more satisfactory results than can be realized with the radio speaker alone—that is to say when an orchestral number or the like is being played in which the bass components are important. I do not assert that such a combination will reproduce as much of the upper register as could be desired, but it is my observation that it brings out enough of the upper register, together with the bass, to produce a much more pleasing result than can otherwise be achieved except through the use of twin speaker equipment.

Figure 2:
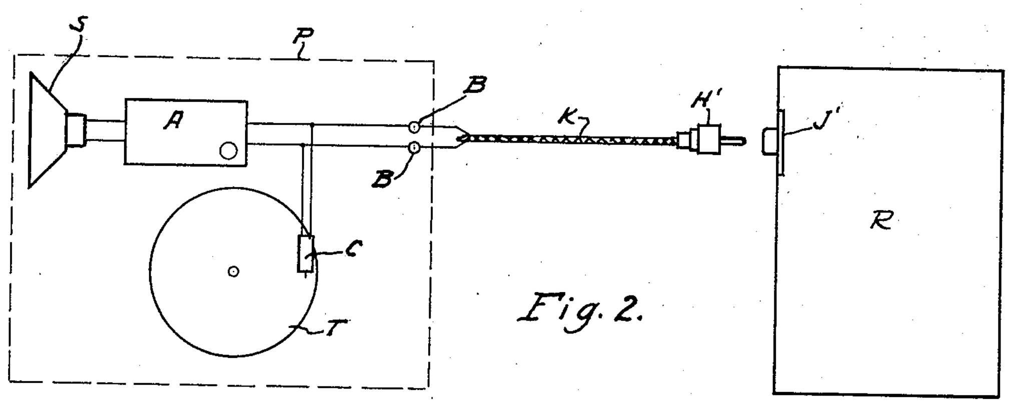
Figure 3:
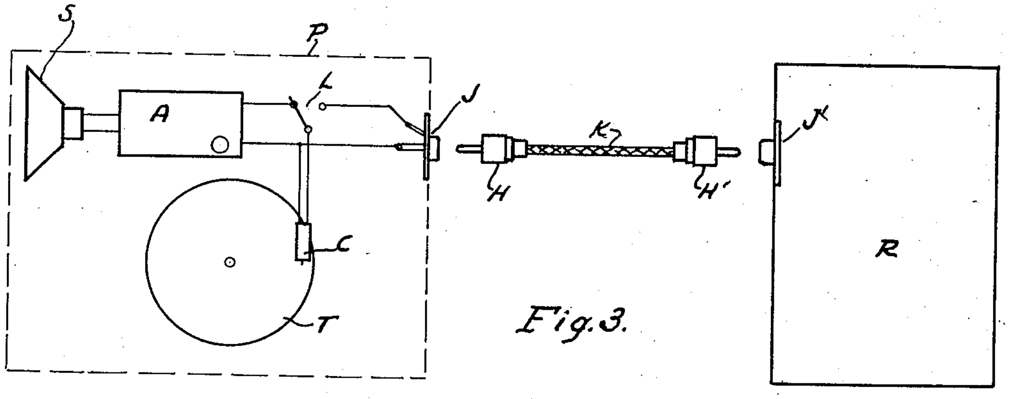

In the drawing which accompanies this specification Figures 1 to 3 inclusive illustrate, respectively, three alternative embodiments of the subject invention—Fig. 1 being what I presently consider to be the preferred embodiment.

In each of the three figures P identifies a record player which includes a turntable T, a pickup cartridge C carried by an arm, not shown, an amplifier A and a loudspeaker S. The cartridge C may, for example, be of the piezo crystal type and its output terminals are shown connected to the input of the amplifier A. What has so far been described will at once be recognized as conventional record player, which may be of the single speed or multiple speed variety. Instead of a mere record player, the unit P may be a combination record player and radio receiver. The term "record player" as used herein should be construed as embracing units which include radio receivers as well as those which do not include radio receivers.

The principal market as respects record players of this type is for something cheap and yet highly profitable to the retail dealer—which situation makes it generally impossible for a manufacturer to put out a quality product and stay in business. The player P will do a passable job with popular and dance records, etc., where tone quality is not too important, and it has the advantage of being highly portable; but when it comes to the playing of high class recordings it is altogether unsatisfactory because of its excessively narrow range.

In addition to the player P, Fig. 1, there is shown a radio receiver R which is assumed to be a comparatively high grade instrument having a good speaker and amplifier and thus inherently capable of good tone quality. In this connection a television receiver may be regarded as a radio receiver with video added.

To the player P, Fig. 1, there has been added a phono-jack J the terminals of which are connected to the terminals of the cartridge C and to the input terminals of the audio amplifier A. The radio receiver R has a similar phono-jack J' which is connected to the input end of the radio receiver audio amplifier. Many radio sets which come equipped with record changers are already provided with jacks J', but except for recent production the record changers are operative to play only records of the 78 R. P. M. variety whereas the player P usually is a three speed machine capable of playing all types of disc records, including the long playing microgroove type.

There is further shown in Fig. 1 a two-conductor cord K having phono-plug terminals H and H' at either end. Manifestly, the cartridge C of player P can be connected to the audio amplifier of the radio receiver by inserting the plug H into jack J and the plug H' into jack J'.

It was not self-evident to me that the arrangement of Fig. 1 would work because with the cartridge C connected to the input circuit of amplifier A, it was not at all certain what the effect would be on the output of the radio receiver R. However, I was happy to find that I not only could employ the radio receiver amplifier and speaker to the exclusion of the amplifier A and speaker S, by turning down to zero the output of amplifier A, but that I could reproduce simultaneously through both amplifiers and speakers and in so doing obtain what to me are amazing and unexpected results—far superior to anything I had anticipated as possible. For instance, I have found, quite beyond expectation, that in playing orchestral selections I can set the tone control of the radio receiver to bring out the bass portion and that the speaker S of the player P will largely make up the resultant deficiency of higher frequencies. Thus, I am able to achieve a quality of reproduction through the use of both speakers which I could not obtain through the radio speaker alone. In other words, I can obtain tone quality through the use of a single speaker radio set in combination with the player P which is otherwise obtainable only through the employment of costly equipment. Only the most expensive radio receivers are equipped with high grade twin speakers and comparable amplifiers; but I find that I can achieve substantially or nearly as good reproduction through the combination of Fig. 1, including an ordinary good single speaker radio set as can be realized through the medium of a twin speaker radio.

In Fig. 2 I have shown an alternative arrangement which differs from Fig. 1 in that the jack J has been replaced by a pair of binding posts B, B or equivalent terminals and wherein one end of the cord K is adapted for connection to the said binding posts or equivalent terminals. While I prefer to use a jack as per Fig. 1, it may sometimes be desirable to substitute binding posts or equivalent terminals in place thereof.

In Fig. 3 I have illustrated another alternative arrangement which is identical with Fig. 1 except for the addition of a two-way switch by means of which the cartridge C can be connected to the two amplifiers alternately but not simultaneously. I would not ordinarily employ the switch L but I anticipate the possibility of encountering situations where it may be impracticable to reproduce through both speakers at the same time, in which event the switch L may serve a useful purpose. Obviously, the switch L could be incorporated in the jack J so as to cut out the amplifier A when plug H is inserted and cut in the radio receiver. Jacks of that kind are well known in the telephone art and are commercially available, but they usually cost more than the combined cost of a simple phono-jack such as I have shown and a simple two-way switch.

It will be more or less apparent that the cord K could be permanently connected to the player P instead of being connected through the medium of a jack or binding posts or the like, and such an arrangement is clearly within the purview of my inventive concept. Obviously, it would not be desirable to have the cord K permanently attached to a portable player, but it would save the cost of a jack and its installation, or that of a pair of binding posts, and may be warranted by competitive considerations.

I wish to make it matter of record for future reference that at the time this application was filed there were numerous single speed and three speed record players on the market. Among these were a plug-in player marketed by Radio Corporation of America and designed to operate through a radio receiver exclusively; and another player also marketed by Radio Corporation of America including an amplifier and speaker and not adapted to operate through a radio receiver. There also was marketed by Columbia Records Inc. a plug-in type player designed to operate exclusively through a radio receiver and adapted to play only 33⅓ R. P. M. records. In addition to the above there were a host of manufacturers putting out single speed and three speed players equipped with amplifiers and speakers, mostly of inferior grade. But so far as I have been able to ascertain no one has heretofore suggested the idea of adapting a self-contained record player so that it could be operated through a radio receiver as well as through its own amplifier and speaker, either alternately or simultaneously. What I have done appears simple indeed, but it is a major contribution to the art and is far from obvious in spite of its simplicity. Otherwise it certainly would have been done before.

I claim:

1. The combination with a radio receiver having an audio amplifier and loudspeaker, of a unitary self-contained record player including a turntable, a pickup, an amplifier and a loudspeaker operative conjointly to play phonograph records, and a pair of conductors connecting the output terminals of the pickup with the input of the radio receiver audio amplifier.

2. A unitary self-contained record player including a turntable, a pickup, an amplifier and a loudspeaker operative conjointly to play phonograph records, and a pair of conductors connected at one end to the output terminals of the pickup and adapted for connection at the other end to the input of a radio receiver audio amplifier whereby records can be played through the speaker of the radio receiver as well as through the speaker of the player.

3. A unitary self-contained record player including a turntable, a pickup, an amplifier and a loudspeaker operative conjointly to play phonograph records, said player including a pair of terminals connected to the output terminals of the pickup and adapted for connection to one end of a pair of conductors for effecting connection to the input of a radio receiver audio amplifier whereby a record on said turntable can be played through the amplifier and speaker of the player or through the amplifier and speaker of a radio receiver or both simultaneously.

4. A unitary self-contained record player including a turntable, a pickup, an amplifier and a loudspeaker operative conjointly to play phonograph records, said player further including a jack connected to the output terminals of the pickup and adapted to receive a plug attached to one end of a two-conductor cord, the arrangement being such as to enable phonograph records to be played through the amplifier and speaker of the player and simultaneously through the amplifier and speaker of a radio receiver.

5. The combination with a radio receiver having an audio amplifier and loudspeaker, of a record player including a turntable, a pickup, an amplifier and loudspeaker combined as a self-contained unit operative in itself to play phonograph records, said player including a jack connected to the terminals of the pickup, and a two-conductor cord having a plug at one end adapted to be inserted into said jack, the other end of said cord being adapted for connection to the input of the radio receiver amplifier.

6. The combination with a radio receiver having a loudspeaker, an audio amplifier and a jack connected to the input of the audio amplifier, of a unitary self-contained record player including a turntable, a pickup, an audio amplifier having its input connected to said pickup, a loudspeaker connected to the output of said audio amplifier, a second jack connected to the output terminals of the pickup, and a two-conductor cord having a plug at each end inserted in said jacks respectively, the arrangement being such that a record on said turntable is playable through both said loudspeakers simultaneously.

7. A record player including a turntable, a pickup, an audio amplifier having its input connected to said pickup, a loudspeaker connected to the output of said amplifier, and a pair of binding posts connected respectively to the terminals of the pickup and adapted for connection to one end of a two-conductor cord.

8. A record player including a turntable, a pickup, an audio amplifier, a loudspeaker, a jack, and circuit connections including a switch for connecting the output terminals of said pickup with the input of said amplifier and with said jack alternatively, said jack being adapted to make connection with a two-conductor cord through which said pickup can be connected to the input of a radio receiver amplifier.

CROSBY GAUTHIER.

REFERENCES CITED

The following references are of record in the file of this patent:

UNITED STATES PATENTS

| Number | Name | Date |
|---|---|---|
| 1,821,495 | Cohen | Sept. 1, 1931 |
| 1,821,496 | Cohen | Sept. 1, 1931 |
| 1,844,583 | Leishman | Feb. 9, 1932 |
| 1,852,424 | Leishman | Apr. 5, 1932 |
| 2,081,277 | Kentz | May 25, 1937 |
| 2,249,606 | Friebus | July 15, 1941 |
| 2,291,115 | Stark | July 28, 1942 |
| 2,352,696 | De Boer | July 4, 1944 |